United States Patent

Senda

(10) Patent No.: US 9,563,441 B2
(45) Date of Patent: Feb. 7, 2017

(54) INFORMATION PROCESSING APPARATUS, INFORMATION PROCESSING APPARATUS STARTUP METHOD, AND RECORDING MEDIUM, CONFIGURED TO DETERMINE STARTUP ORDER OF MULTIPLE MODULES

(71) Applicant: Shigeya Senda, Shizuoka (JP)

(72) Inventor: Shigeya Senda, Shizuoka (JP)

(73) Assignee: RICOH COMPANY LTD., Tokyo (JP)

( * ) Notice: Subject to any disclaimer, the term of this patent is extended or adjusted under 35 U.S.C. 154(b) by 149 days.

(21) Appl. No.: 14/547,309

(22) Filed: Nov. 19, 2014

(65) Prior Publication Data

US 2015/0143092 A1    May 21, 2015

(30) Foreign Application Priority Data

Nov. 20, 2013  (JP) ................................ 2013-240058

(51) Int. Cl.
  *G06F 9/44*  (2006.01)
(52) U.S. Cl.
  CPC ........... *G06F 9/4405* (2013.01); *G06F 9/4403* (2013.01)
(58) Field of Classification Search
  CPC .............................. G06F 9/4403; G06F 9/4405
  USPC ......................................................... 713/1, 2
  See application file for complete search history.

(56) References Cited

U.S. PATENT DOCUMENTS

| 7,448,030 | B2 * | 11/2008 | Liu ...................... G06F 9/4403 714/38.14 |
| 7,702,891 | B1 * | 4/2010 | Nazarov ................ G06F 9/445 713/1 |
| 8,873,070 | B2 * | 10/2014 | Okutsu .................. G03G 15/50 358/1.13 |
| 2003/0055890 | A1 | 3/2003 | Senda |
| 2006/0070045 | A1 | 3/2006 | Senda |
| 2006/0212730 | A1 | 9/2006 | Senda |
| 2008/0141050 | A1 | 6/2008 | Senda |
| 2009/0063837 | A1 * | 3/2009 | Shayer ................. G06F 9/4401 713/2 |
| 2009/0161513 | A1 | 6/2009 | Senda |
| 2009/0307499 | A1 | 12/2009 | Senda |
| 2010/0268967 | A1 | 10/2010 | Senda |
| 2011/0197066 | A1 | 8/2011 | Senda |
| 2012/0324238 | A1 | 12/2012 | Senda |
| 2013/0077784 | A1 | 3/2013 | Senda |
| 2013/0227267 | A1 | 8/2013 | Senda |

(Continued)

FOREIGN PATENT DOCUMENTS

| JP | 2009-104443 | 5/2009 |
| JP | 2010-086145 | 4/2010 |

*Primary Examiner* — Chun Cao
(74) *Attorney, Agent, or Firm* — Cooper & Dunham LLP

(57) ABSTRACT

An information processing apparatus includes a startup condition acquisition unit that acquires a startup condition of multiple program modules, a determination unit that determines a startup order of the multiple program modules by multiple CPU cores, a startup unit that starts up the multiple program modules by executing an executable program module in accordance with the startup order by the multiple CPU cores, an updating unit that updates load information that indicates multiple CPU core load that fluctuates during a startup process, and a limitation unit that limits startup of the program module by the multiple CPU cores based on the load information updated by the updating unit.

10 Claims, 11 Drawing Sheets

(56) References Cited

U.S. PATENT DOCUMENTS

2014/0068613 A1* 3/2014 Iriguchi .............. G06F 9/45545
718/1

* cited by examiner

Target.lst
| App1 |
| App2 | somedaemon.script

```
[unit]
Desription=" somedaemon description."
Requires=" mounted /somedir"
Effect=" created /var/XXX"

[service]
ExecStart=" /somedir/bin/somedaemon.sh"
```

INFORMATION PROCESSING APPARATUS, INFORMATION PROCESSING APPARATUS STARTUP METHOD, AND RECORDING MEDIUM, CONFIGURED TO DETERMINE STARTUP ORDER OF MULTIPLE MODULES

CROSS-REFERENCE TO RELATED APPLICATION

This patent application is based on and claims priority pursuant to 35 U.S.C. §119(a) to Japanese Patent Application No. 2013-240058, filed on Nov. 20, 2013 in the Japan Patent Office, the entire disclosure of which is hereby incorporated by reference herein.

BACKGROUND

Technical Field

The present invention relates to an information processing apparatus, information processing apparatus startup method, and a non-transitory recording medium storing an information processing apparatus startup control program.

Background Art

Multicore CPUs that include multiple CPU cores have been adopted in information processing apparatuses and have become widely used in information processing apparatuses embedded in various apparatuses (embedded systems). In those information processing apparatuses, it is desired to use the multicore CPU effectively and optimize various processes. Especially, from the viewpoint of usability, it is demanded that startup time of the information processing apparatus after turning the power on until becoming available to users be shortened.

Conventional start-up methods of an operating system that speed up the startup by executing divided kernel images sequentially using the multicore CPU are known. However, in the conventional startup method described above, only the startup of the operating system before booting a kernel is speeded up, and therefore the startup of the information processing apparatus could be delayed because the multicore CPU cannot be used effectively after booting the kernel.

On the other hand, conventionally, information processing apparatuses that speed up the boot time by executing multiple program modules in the startup process simultaneously using the multicore CPU after booting the kernel are known.

FIG. 15 is a diagram illustrating a startup process in the conventional information processing apparatuses and an example of a known startup process implemented by information processing apparatuses in which UNIX or Linux is installed.

First, for comparison, the startup process of the information processing apparatus that does not execute multiple program modules simultaneously is described below.

In the startup process A shown in FIG. 15, init (SysVinit in this case) program of UNIX is executed in the startup of the information processing apparatus. The init program performs the startup process of the information processing apparatus. The information processing apparatus is initialized by an init process based on the init program, and multiple program modules of the startup process are executed sequentially. Consequently, multiple program modules (i.e., Syslog, D-Bus, Avahi, and Bluetooth in this case) are executed sequentially.

In the startup process B shown in FIG. 15, after starting up Upstart as an init program, multiple program modules are executed. In this case, for example, if a program module related to Universal Serial Bus (USB) is executed before a USB device gets ready, a certain amount of resource is consumed due to load of the program module into memory and other program modules are prevented from executing. In addition, some program modules do not function properly if other program modules are not executed. To cope with this issue, here, startup of multiple program modules is controlled, and program modules are executed using events that occur at the information processing apparatus a trigger. As a result, it is possible to reduce resource conflict due to unnecessary program startup while some of program modules (i.e., Avahi and Bluetooth in this case) are executed simultaneously.

In a startup process C shown in FIG. 15, after systemd is executed in Linux, multiple program modules are executed. Here, systemd is an init program developed from Upstart, and systemd executes multiple program modules simultaneously and speeds up the startup time of the information processing apparatus. In this case, Syslog, D-Bus, Avahi, and Bluetooth are executed simultaneously.

SUMMARY

Example embodiments of the present invention provide a novel information processing apparatus that includes a startup condition acquisition unit that acquires a startup condition of multiple program modules, a determination unit that determines a startup order of the multiple program modules by multiple CPU cores, a startup unit that starts up the multiple program modules by executing an executable program module in accordance with the startup order by the multiple CPU cores, an updating unit that updates load information that indicates multiple CPU core load that fluctuates during a startup process, and a limitation unit that limits startup of the program module by the multiple CPU cores based on the load information updated by the updating unit.

Further example embodiments of the present invention provide startup of an information processing apparatus control method, and a non-transitory recording medium storing an information processing apparatus start-up control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a diagram illustrating a target list as an embodiment of the present on.

FIG. 6 is a diagram illustrating a startup script as an embodiment of the present invention.

FIG. 7 is a diagram illustrating a dependency relation among multiple program modules as an embodiment of the present invention.

DETAILED DESCRIPTION

Figure 1:
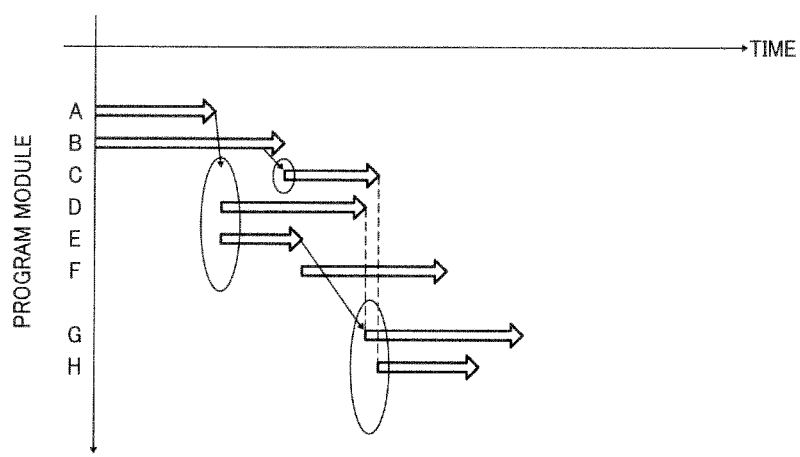
FIG. 1 is a schematic diagram illustrating a startup process in an information processing apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the conventional technologies described above, in starting up program modules, for example, memory to be used is allocated by a CPU core, a program module is loaded from a storage device into memory, and the program module is executed by the CPU core. As described above, in starting up a program module, information processing apparatus resources are consumed, constituting a load on those resources. By contrast, in systemd, since multiple program modules that satisfy startup condition are executed simultaneously and indiscriminately, resource conflict occurs sometimes. As a result, it is possible that the startup process of the information processing apparatus is delayed since multiple CPU cores cannot execute multiple programs in the startup process smoothly. Especially, in embedded systems in which resources are limited compared to servers that include ample amounts of memory and many CPU cores, it is possible that resource conflict occurs easily, and simultaneous execution of multiple program modules has a significant impact.

In the following embodiment, an information processing apparatus that executes multiple program modules in the startup process smoothly using multiple CPU cores and keeps delay in the startup process within reasonable bounds is provided.

The information processing apparatus in this embodiment includes at least one multicore CPU. The multicore CPU is a multicore processor that includes multiple CPU cores (processor cores), and the multicore CPU executes multiple processes simultaneously using the multiple CPU cores. In case of starting up the information processing apparatus, multiple program modules in the startup process of the information processing apparatus are executed by the multiple CPU cores in the multicore CPU, and the information processing apparatus starts. Program modules are various programs executed in the startup process of the information processing apparatus, and each program module is executed (started up) as a process by the CPU core.

FIG. 1 is a schematic diagram illustrating a startup process in an information processing apparatus as an embodiment and illustrates a startup process by the information processing apparatus that includes three CPU cores.

As shown in FIG. 1, in case of starting up the information processing apparatus, a program that performs the startup process (i.e., init program in this case) is started up, and multiple program modules from A to H of the startup process are executed by init process based on the init program. As shown by white right arrows, the multiple program modules from A to H are executed in predetermined order by the three CPU cores.

In FIG. 1, normal arrow (black arrow) indicates that there is dependency relation between the program module of the white arrow in its starting point and the program module of the white arrow in its endpoint. Here, a dependency relation means a relationship between program modules such that one program module depends on another program module. For example, there is a dependency relation between program modules if one program can be started up only on the condition that another program module is started, or one program cannot be started up due to another program module.

The information processing apparatus in this embodiment controls executing (starting up) multiple program modules (processes) and executes, at a maximum, the same number of program modules as the number of CPU cores. The information processing apparatus also controls execution order of the multiple program modules based on the dependency relation among multiple program modules and limits executing program modules in accordance with multiple CPU core load. In this case, while three program modules can be executed simultaneously by the three CPU core, the program module C depends on the program module B, and program modules D and E depend on the program module A. Therefore, the program modules A and B are executed first.

After finishing starting up the program module A, the program modules D and E become executable, and the program modules D and E are executed along with the program module B. Subsequently, after finishing starting up the program module B, the program module C becomes executable, and the program module C is executed along with the program modules D and E. After finishing starting up the program module E, the program module F is executed in this case. In addition, after finishing starting up the program module D, the program module G is executed, and after finishing starting up the program module C, the program module H is executed.

As described above, the information processing apparatus in this embodiment controls starting order of multiple program modules without executing multiple program modules simultaneously and indiscriminately. In addition, the number of program modules executed simultaneously is limited in accordance with the state of the resources (i.e., CPU resources in this case), and the number of executed program modules is less than or equal to the number of the CPU cores. Consequently, it is possible to control resource conflict and control the delay in the startup process due to resource conflict, and that can speed up the startup time of the information processing apparatus.

An image forming apparatus that includes the information processing apparatus s described in detail below as an example. In this case, the image forming apparatus is a multifunction peripheral (MFP) that includes multiple functions such as a facsimile, printer, copier, and scanner.

Figure 2:
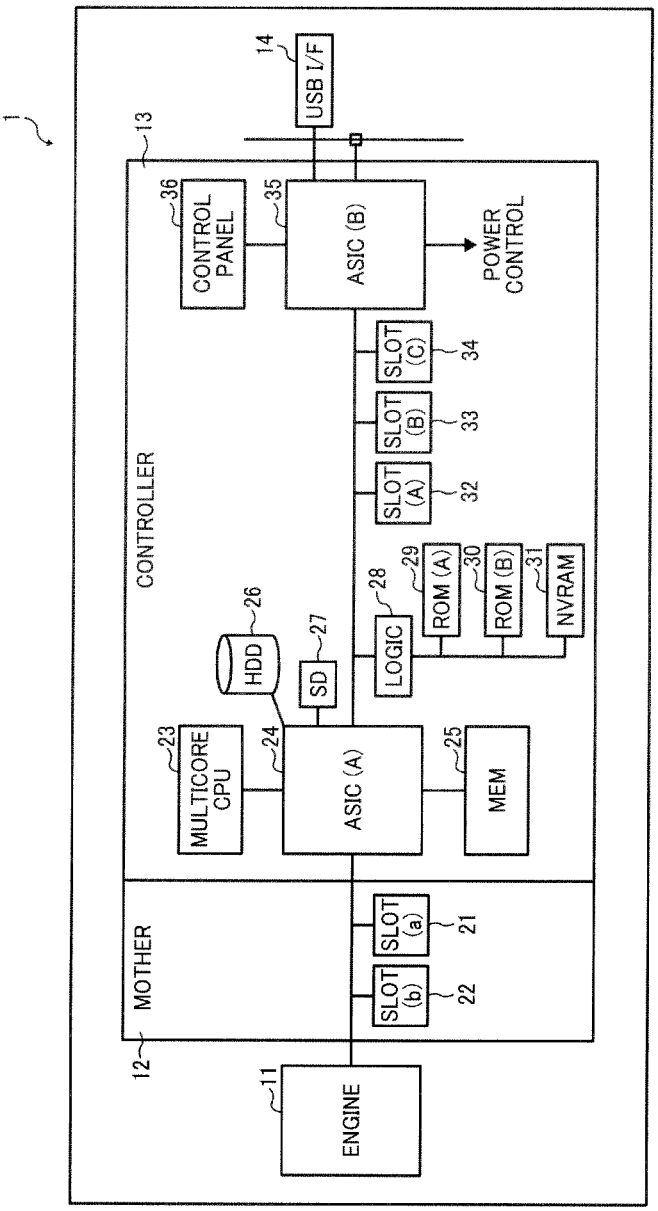
FIG. 2 is a block diagram illustrating a hardware configuration of an image forming apparatus as an embodiment of the present invention.

FIG. 2 is a block diagram illustrating a hardware configuration of an image forming apparatus 1 in this embodiment.

As shown in FIG. 2, the image forming apparatus 1 as an example of the information processing apparatus includes an engine 11, a board for expansion slots 12, a controller 13, and a USB interface (I/F) 14. The engine 11 is an engine of the image forming apparatus 1, e.g., a printer engine, a scanner engine, or a facsimile engine. The board for expansion slots 12 includes two Peripheral Component Interconnect (PCI) slots (a) 21 and (b) 22, and the board for expansion slots 12 is connected to the controller 13. The controller 13 controls the whole part of the image forming apparatus 1 including the engine 11. The USB I/F 14 is connected to various USB devices.

Next, the configuration of the controller 13 is described below. A multicore CPU 23 is a CPU that includes multiple CPU cores (not shown in figures) and controls each part of the image forming apparatus 1 by executing an operating system (OS) and various programs. An Application Specific Integrated Circuit (ASIC) (A) 24 performs various image processing under the control of the multicore CPU 23. For example, the ASIC (A) 24 converts print data received from an external apparatus into image data. A MEM (memory) 25 is a line memory that stores the image data, a main memory of the image forming apparatus 1, and used as a work area for programs.

A hard disk drive (HDD) 26 is a storage device that stores image data, management information, font data, OS, and programs etc. A Secure Digital (SD) 27 is a SD memory card as a nonvolatile memory and inserted in a SD memory card slot. A LOGIC 28 is an Integrated Circuit (IC) that generates a local bus signal from a PCI signal. A Read Only Memory (ROM) (A) 29 and a ROM (B) 30 store programs executed after the image forming apparatus 1 is turned on such as Basic Input/Output System (BIOS).

A Nonvolatile Random Access Memory (NVRAM) 31 is an example of a nonvolatile memory and stores settings etc. of the image forming apparatus 1. A slot (A) 32, a slot (B) 33, and a slot (C) 34 are PCI slots. An ASIC (B) 35 is connected to the ASIC (A) 24 via PCI, and the ASIC (B) 35 controls a power supply of the image forming apparatus 1. A control panel 36 is a user interface (UI) that includes a display, and the control panel 36 accepts user operation on the image forming apparatus 1.

In the startup process of the image forming apparatus 1, after turning on the power supply, a reset signal is input to the ASIC (B) 35, and the ASIC (B) 35 supplies electric power to each unit in the image forming apparatus 1 by controlling the power supply. In addition, the reset signal is input to each unit in the image forming apparatus 1. Subsequently, the multicore CPU 23 executes an initialization program stored in the ROM (A) 29, and each unit in the image forming apparatus 1 is initialized by the initialization program. After that, the image forming apparatus 1 starts up a generic OS using the multicore CPU 23 and starts up various programs and applications.

Figure 3:
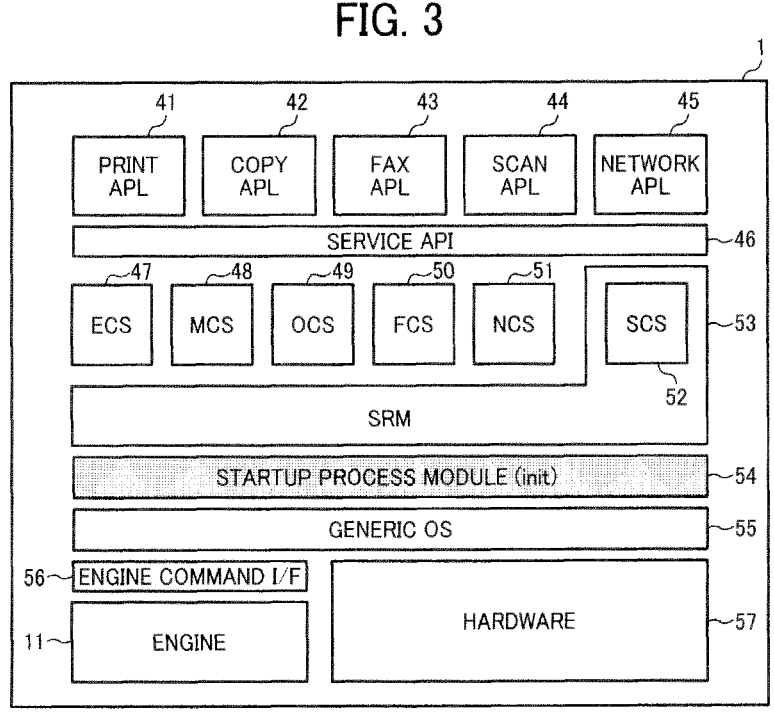
FIG. 3 is a block diagram illustrating a software configuration of an image forming apparatus as an embodiment of the present invention.

FIG. 3 is a block diagram illustrating a software configuration of the image forming apparatus 1 in this embodiment.

As shown in FIG. 3, the image forming apparatus 1 includes a print application (PRINT-APL) 41, a copy application (COPY-APL) 42, a facsimile application (FAX-APL) 43, a scan application (SCAN-APL) 44, and a network application (NETWORK-APL) 45. These applications display a UI screen for configuring execution condition of a job on the display of the control panel 36, and user configuration is accepted by the control panel 36. Here, the application is a program positioned on a layer higher than a generic OS 55 and a sort of an embedded program.

A service Application Programming Interface (API) 46 is an API to be used for reading a service on a service layer by the application described above. The service layer includes an Engine Control Service (ECS) 47, a Memory Control Service (MCS) 48, a cOntrol panel Control Service (OCS) 49, a Facsimile Control Service (FCS) 50, a Network Control Service (NCS) 51, a System Control Service (SCS) 52, and a System Resource Manager (SRM) 53.

A startup process module 54 is a program that performs the startup process of the image forming apparatus 1 (init program) and executes init process when the image forming apparatus 1 is started as described above. The generic OS 55 is an OS such as UNIX or Linux etc. An engine command I/F 56 is a programming interface used for communicating with the engine 11 by the generic OS 55. A hardware 57 indicates hardware resources in the controller 13 (e.g., the multicore CPU 23 and the MEM 25 etc.).

Figure 4:
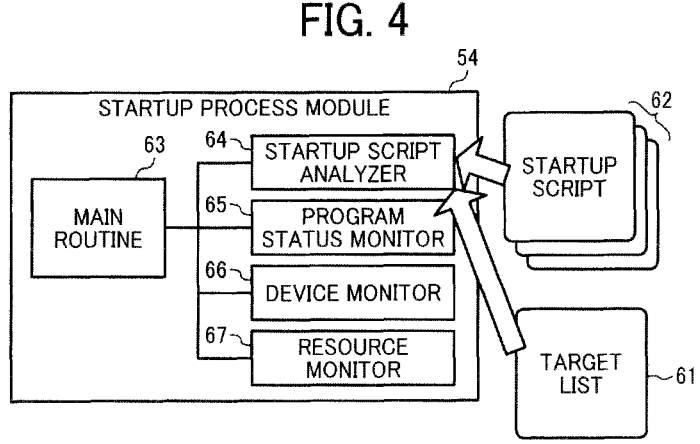
FIG. 4 is a diagram illustrating a configuration of a startup process module as an embodiment of the present invention.

FIG. 4 is a diagram illustrating a configuration of the startup process module in this embodiment.

As shown in FIG. 4, after the startup process module 54 starts, a target list 61 and a startup script 62 are acquired by the startup process module 54 as a function implementation unit of the image forming apparatus 1. The target list 61 and the startup script 62 are stored in a file system in the HDD 26 preliminarily, and the startup process module 54 performs the startup process of the image forming apparatus 1 based on the target list 61 and the startup script 62 read from the HDD 26.

Figures 5, 6, 7:
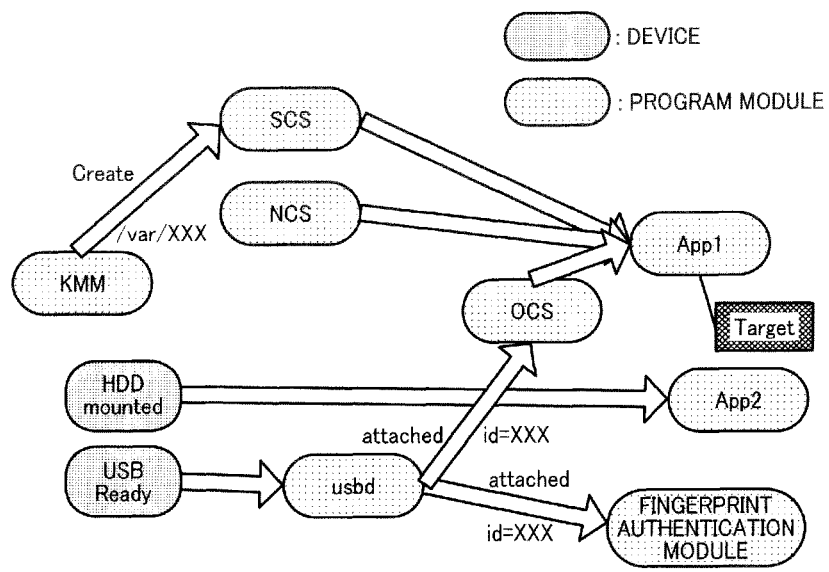

FIG. 5 is a diagram illustrating the target list 61 in this embodiment. As shown in FIG. 5, the target list 61 is a list of program modules executed in the startup process of the image forming apparatus 1, and program modules (i.e., App 1 and App 2 in this case) are described sequentially in accordance with priority order of execution. Here, App 1 and App 2 are applications as a sort of a program module. If there are multiple program modules, higher program modules have higher priority of startup. In FIG. 5, App 1 is executed in prior to App 2. In the description below, in case of differentiating from other program modules specifically, the program modules described in the target list 61 are referred to as target program modules.

Not only applications but also various program modules are described in the target list 61. In addition, only target program modules executed finally are described in the target list 61. Therefore, even if a program module executed for starting up the target program modules preliminarily exists, the program module is not described in the target list 61.

In the startup script 62 (shown in FIG. 4), detailed information on multiple program modules for the startup process of the image forming apparatus 1 is described, and the startup script 62 is created preliminarily for each of multiple program modules. In addition, startup condition for each program modules is described. The startup condition is a condition for starting up each of the program modules (execution condition) and various conditions are configured in accordance with a type of the program module. The HDD 26 as a storing unit stores the startup script 62 and startup conditions for each of multiple program modules included in the startup script 62.

FIG. 6 is a diagram illustrating the startup script 62 that consists of general sections in this embodiment.

As shown in FIG. 6, the startup script 62 (i.e., somedaemon.script in this case) is a text that the startup process module 54 determines startup operation of program modules and starts up the program modules. For example, in [unit] section, "Description" specifies a name of a program module to be executed. Similarly, "Requires" indicates preliminary condition for executing a program module (an example of the startup condition). In this case, the program module is executed under the condition of mounting "/somedir". If the program module is executed under the condition of execution of another program module, that is described in "Requires".

"Effect" indicates an event of the image forming apparatus 1 generated by executing the startup script 62 and rules postcondition of a program module. "Effect=" created /var/ XXX" indicates that a file "XXX" is created in directory "var". If the event in "Effect" is required in "Requires" in other startup script 62, there is dependency relation among program modules. For example, if "Requires" in the startup script 62 of a program module M considers an event in "Effect" in the startup script 62 of a program module N as a startup condition (precondition), the program module M depend on the program module N. As described above, the startup process module 54 determines and specifies the dependency relation among program modules based on the startup script 62.

In "ExecStart" in [service] section, a program module to be executed and location where it is stored (path) are described, and shell script is described in some cases. In the startup process of the image forming apparatus 1 (shown in FIG. 4), the startup process module 54 executes program modules based on the startup scripts 62 of multiple program modules and starts up multiple program modules.

Main 63 in the startup process module 54 is a main routine of the startup process module 54. The main 63 manages the whole part of the process performed by the startup process module 54, instructs the CPU core to execute the program module, and starts up the program module. By executing the startup process module 54, the main 63 acquires the target list 61 and the startup script 62 from the HDD 26 and executes each program module based on a processing result of a subroutine shown below.

A startup script analyzer 64 acquires the startup script 62 needed for executing target program modules based on the target list 61. The startup script 62 includes the startup script 62 for one or more program modules needed for executing target program modules in addition to the startup script 62 of target program modules.

The startup script 62 is stored in the MEM 25 as the acquired data (internal data) and analyzed by the startup script analyzer 64. More specifically, based on the startup condition of a program module described in the startup script 62 the startup script analyzer 64 specifies if it is needed to execute another program module for executing the program module. Otherwise, the startup script analyzer 64 specifies if it is needed to start up a device (including hardware) in the image forming apparatus 1 for executing the program module.

As described above, the startup script analyzer 64 functions as a startup condition acquisition unit and a dependency relation specifying unit. In the startup process of the image forming apparatus 1, the startup script analyzer 64 acquires the startup conditions for multiple program modules from the startup script 62 and specifies the dependency relation among multiple program modules base on the startup conditions. In addition, the startup script analyzer 64 specifies a resource to be monitored in the image forming apparatus 1 based on the startup condition of the program modules.

A program state monitor 65 monitors state of multiple program modules in the startup process of the image forming apparatus. For example, it is assumed that the startup script analyzer 64 specifies that it is needed to execute the program module Q for executing program module P and execute the program module R for executing the program module Q. In this case, in order to execute the program module P, the program state monitor 65 monitors execution state of the program modules Q and R and determines whether or not it is finished to execute the program modules Q and R.

A device monitor 66 monitors a device needed for executing a program module in the image forming apparatus 1. For example, if the startup script analyzer 64 specifies that it is needed to mount the HDD 26 for executing a program module, the device monitor 66 monitors the HDD 26 and determines whether or not the HDD 26 is mounted. If the startup script analyzer 64 specifies that it is needed to turn the USB I/F 14 into ready state for executing a program module, the device monitor 66 monitors the USB I/F 14 and determines whether or not the USB I/F 14 is turned into ready state.

A resource monitor 67 monitors resources related to startup of program modules in the image forming apparatus 1. For example, if creation of a file is described as the startup condition in the startup script 62, the startup script analyzer 64 specifies that the MEM 25 where the file is stored is the resource to be monitored. In this case, the resource monitor 67 monitors whether or not the file is stored in the MEM 25.

Next, procedure for executing two applications App 1 and App 2 as the target program modules (shown in FIG. 5) by the startup process module 54 is described below.

FIG. 7 is a diagram illustrating a dependency relation among multiple program modules in this embodiment and device state as the startup conditions of the program modules.

In FIG. 7, arrows indicate dependency relation in starting up program modules. The program module at the endpoint of an arrow is executed under the condition of executing the program module at the starting point of the arrow or satisfying state of the device at the starting point of the arrow.

As shown in FIG. 7, an event as a startup condition (precondition) of a program module at the endpoint of the arrow is described on some arrows. The startup condition corresponds to descriptions "Effect" and "Requires" in the startup script 62. For example, description "create /var/ XXX" on the arrow from KMM to SCS indicates that a file "XXX" is created in director "var" by executing KMM. SCS becomes executable under the condition of "create /var/ XXX". In addition, "attached id=XXX" is described on the arrow from usbd. Here, "attached" indicates that the USB driver in the generic OS 55 becomes valid by executing usbd and the USB driver is connected to a USB device. In addition, "id" indicates a port ID and means that which USB port is connected to the USB device. Lastly, OCS and a fingerprint authentication module become executable under the condition of "attached id=XXX".

In case of connecting a USB device to the USB I/F 14, the executed usbd detects that the USB device is connected to the USB and reports to the device monitor 66 about that.

Otherwise, the device monitor 66 monitors the usbd state and detects that the USB device is connected. Consequently, the device monitor 66 determines that the USB device turns into ready state and becomes usable. If a control panel device as the USB device is connected to the USB I/F 14 and the startup condition of OCS is satisfied, the main 63 in the startup process module 54 executes OCS that manages the control panel device. If a fingerprint authentication device as the USB device is connected to the USB I/F 14 and the startup condition of the fingerprint authentication module is satisfied, the main 63 executes the fingerprint authentication module.

In FIG. 7, in accordance with the dependency relation among program modules including the dependency relation described above, it is needed to execute SCS, NCS, and OCS for executing App 1, and it is needed to execute KMM for executing SCS. In addition, it is needed to execute usbd for executing OCS and to turn the USB I/F 14 into ready state for executing usbd. By contrast, App 2 becomes executable under the condition of mounting HDD 26. Therefore, App 2 is executed after it is determined that the HDD 26 is mounted by the device monitor 66.

In the startup process of the image forming apparatus 1, the startup script analyzer 64 in the startup process module 54 functions as a determination unit that determines order of starting up multiple program modules (startup order). The startup script analyzer 64 specifies the dependency relation among multiple program modules base on the startup condition and determines the order of executing multiple program modules based on the specified dependency relation.

More specifically, based on the startup condition of a program module described in the startup script 62, the startup script analyzer 64 specifies a program module or device to be executed preliminarily in order to start up the program module. Consequently, one or more other program modules (second program module) needed for executing a program module (first program module) are specified.

In this case, the startup script analyzer 64 acquires a name of a program module from the target list 61 in accordance with priority, acquires the startup script 62 of the target program module, and checks if the precondition as the startup condition exists. If the precondition exists, the startup script analyzer 64 specifies the program module to be executed in order to satisfy the precondition based on the startup script 62. In addition, the startup script analyzer 64 searches for the program module whose postcondition is the event requested by the precondition through the startup script 62. As described above, by tracing the precondition and the postcondition sequentially, all program modules needed for executing the target program modules App 1 and App 2 are specified, and the startup order of the multiple program modules to be executed is determined.

In the startup process of the image forming apparatus 1, the main 63 in the startup process module 54 functions as a startup unit (startup controller) that controls the startup of program modules and starts up multiple program modules. In accordance with the startup order determined by the startup scrip analyzer 64, the main 63 executes the executable program modules that satisfy the startup condition sequentially using the multiple CPU cores. Consequently, the multiple program modules to be executed are executed sequentially in accordance with the startup order.

Figure 8:
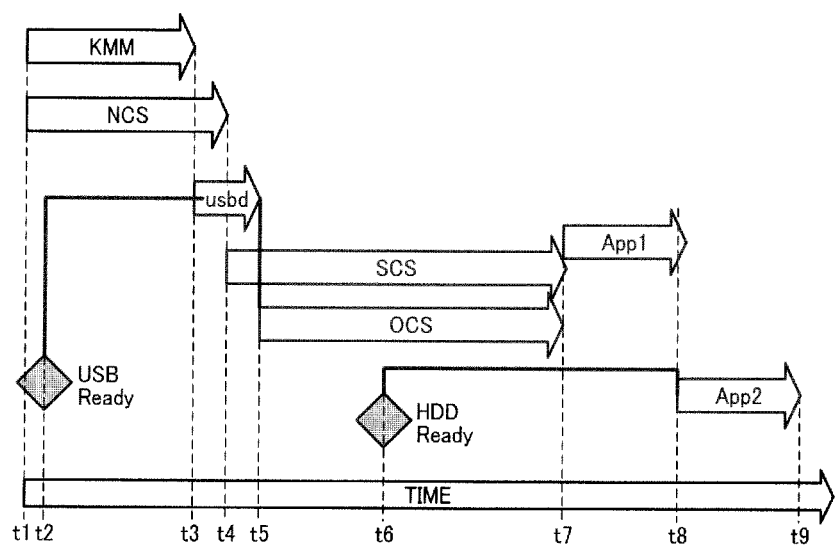
FIG. 8 is a diagram illustrating startup order among multiple program modules as an embodiment of the present invention.

FIG. 8 is a diagram illustrating startup order among multiple program modules in this embodiment and device state as the startup condition of program modules. In addition, FIG. 8 is a sequential diagram illustrating the startup order based on the dependency relation among multiple program modules shown in FIG. 7 and an example of executing multiple program modules using two CPU cores.

In FIG. 8, the arrow heading down to right indicates that the CPU core is occupied by a process of the program modules and the program module is executing. It should be noted that the endpoint of arrows does not always indicate the end of the process, and some actual processes might occupy the CPU core intermittently depending on its operation and processing.

As shown in FIG. 8, based on the dependency relation described above shown in FIG. 7, the startup script analyzer 64 determines that KMM and NCS is to be executed first in order to execute App 1 and it is needed that the USB I/F 14 is in ready state. As a result, the main 63 executes KMM and NCS using multiple CPU cores and starts executing KMM and NCS in t1. Simultaneously, the program state monitor 65 monitors the execution state of KMM and NCS. In addition, the device monitor 66 monitors the state of the USB I/F 14 and determines that the USB I/F 14 is turned into ready state in t2. Subsequently, if the program state monitor 65 determines that it is finished to start up KMM, the main 63 starts executing usbd in t3.

When it is finished to start up KMM, load on multiple CPU cores decreases to the state that next program module can be executed (load state), and load returns to its original state after starting executing usbd. Load on multiple CPU cores changes in accordance with finishing executing program modules and starting executing program modules.

If the program state monitor 64 determines that it is finished to start up NCS, the main 63 starts executing SCS in t4. Subsequently, if the program state monitor 64 determines that it is finished to starting up usbd, the main 63 starts executing OCS in t5. In addition, the device monitor 66 monitors HDD 26 as the device needed for executing App 2 and determines that the HDD 26 is mounted after the HDD 26 is turned into ready state in t6.

Next, if the program state monitor 64 determines that it is finished to start up SCS and OCS, the main 63 starts executing App 1 after its startup condition is satisfied in t7. Lastly, if the program state monitor 64 determines that it is finished to start up App 1, the main 63 starts executing App 2 after its startup condition is satisfied in t8. After finishing starting up App 2 in t9, it is finished to execute all target program modules described in the target list 61.

In the startup process described above, the image forming apparatus 1 adjust execution of program modules by the multiple CPU cores based on load on multiple CPU cores and usage rate of memory. Consequently, resource conflict due to simultaneous execution of multiple program modules can be reduced. The process of adjusting startup of program modules is a complicated process for the startup process module 54. Therefore, the generic OS 55 (kernel) in the image forming apparatus 1 includes an adjuster for startup of program modules (startup adjustment module) and provides the function of the startup adjustment unit. By performing the startup adjustment process by the generic OS 55 that includes information on resources in the image forming apparatus 1, it is possible to determine startup adjustment and perform the startup adjustment process quickly. When the main 63 in the startup process module 54 issues a system call, the startup adjuster in the generic OS 55 is called up and performs the process of adjusting startup of program modules.

Figure 9:
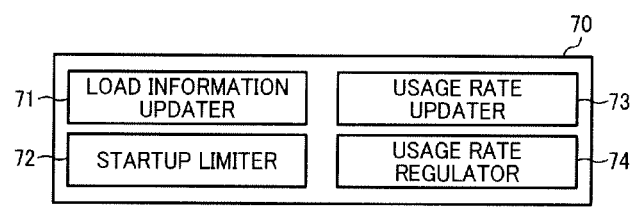
FIG. 9 is a block diagram illustrating an adjuster for starting up program modules as an embodiment of the present invention.

FIG. 9 is a block diagram illustrating an adjuster for starting up program modules 70 in this embodiment.

As shown in FIG. 9, the adjuster 70 includes a load information updater 71 that updates load information on multiple CPU cores, a startup limiter 72 that limits startup of program modules, a usage rate updater 73 that updates memory activity, and a usage rate regulator 74 that regulates memory usage.

The load information updater 71 is an acquisition unit that acquires load information that indicates multiple CPU core load. In addition, the load information updater 71 is an updating unit that updates the load information. The load information indicates load on multiple CPU cores that execute program modules that fluctuates in response to multiple CPU core load in the startup process of the image forming apparatus 1. The load information updater 71 updates the load information on the multiple CPU cores repeatedly in starting up the multiple program modules by the multiple CPU cores. In the startup process of the image forming apparatus 1, the load information is updated at predetermined timing by the load information updater 71, and the latest load information is acquired.

For example, the load information consists of information on the number of CPU cores that execute program modules, activity of the multiple CPU cores, and load average. In this case, the load information is load average, and the load information is calculated and acquired by the load information updater 71. The load average is an index that indicates amount of load on a CPU provided by UNIX-like OS, and the load average reflects the average number of program modules (processes) waiting for execution. That is, the load average indicates the average approximate number of program modules that cannot be executed since other program modules are currently executed. In general UNIX-like OS, for example, the load average can be calculated by calculating an average number of entries in a queue where program modules to be executed are buffered (execution queue) in the past.

By contrast, in the multicore CPU 23 that includes multiple CPU cores, there are queues for each of CPU cores. Therefore, the total number of tasks executed by the multiple CPU cores is acquired by summing the number of tasks currently executed in the queue associated with each of CPU cores, and an average of the multiple total numbers is calculated. This average is considered as the load average, and activity of multiple CPU cores can be calculated by dividing the load average by the number of CPU cores.

In some cases, the startup process of the image forming apparatus finishes in several seconds. In that case, in order to figure out the change of the load average during the startup process, it is needed to acquire the load average in short period of time than ever before. To cope with this issue, the load information updater 71 in this embodiment calculates the load average during predetermined time approximate to 100 msec (e.g., from 50 msec to 150 msec). For example, the total number of program modules executed by the multiple CPU cores at every 10 msec, and the average of ten total numbers is calculated. Consequently, the load average during 100 msec can be calculated.

The load average calculated as described above varies in accordance with amount of processes that the CPU resource is requested (throughput) and reflects the amount of processes that the CPU resource is requested in case the number of processes that can be processed by one CPU core is considered as 1. For example, if one program module keeps occupying one CPU core, the load average approaches to 1 gradually. If two program modules keep occupying two CPU cores, the load average approaches to 2 gradually. In case of executing two program modules by one CPU core, if one program occupies the CPU core and the other program modules is waiting for being executed, the load average approached to 2 gradually. In addition, if the load average becomes smaller by 1 approximately than the number of CPU cores that the image forming apparatus 1 includes, it is determined that the CPU resource has been released.

The startup limiter 72 is a limitation unit that limits startup (execution) of program modules by the multiple CPU cores based on the load average as an example of load information. The startup adjuster 70 as the adjusting unit adjusts starting up program modules by the multiple CPU cores by instructing the startup limiter 72 to limit the number of program modules executed by the multiple CPU cores. Here, the startup limiter 72 includes a determination unit that determines whether or not startup of program modules by the multiple CPU cores is limited based on the load average, and the startup limiter 72 limits startup of program modules by the multiple CPU cores based on the determination result provided by the determination unit.

More specifically, the determination unit in the startup limiter 72 determines whether or not next program module (new program module) can be executed by the multiple CPU cores that execute program modules based on the load average updated by the load information updater 71. Consequently, it is determined whether or not startup of the new program module is limited, and the startup limiter 72 limits starting up the next program module by the multiple CPU cores based on the determination result provided by the determination unit. The next program module is one or more executable program modules that will be executed after the program module currently executed and specified based on startup order of multiple program modules.

In addition, the startup limiter 72 includes a stop unit that stops executing the next program module based on the determination result provided by the determination unit and a release unit that restarts executing the next program module. The stop unit in the startup limiter 72 stops executing the next program module temporarily if the determination unit determines that the next program module is not executable. After stopping executing the next program module, the release unit in the startup limiter 72 restarts executing the next program module by the stop unit if the determination unit determines that the next program module is executable. Consequently, the release unit instructs the multiple CPU cores to execute the next program module.

The usage rate updater 73 is an acquisition unit that acquires memory usage used by the multiple CPU cores and an updating unit that updates the memory usage. The memory is a main memory (i.e., MEM 25 in this case) used by the multiple CPU cores that executes program modules that data is read/written, and the memory usage indicates memory usage capacity. The memory usage can be calculated by dividing memory capacity in use WA by total usable capacity of memory WB (WA/WB), and the memory usage varies in accordance with amount of used memory. Based on two capacities WA and WB, the usage rate updater 73 calculates and acquires the memory usage. In addition, the usage rate updater 73 updates the memory usage repeatedly while the multiple CPU cores execute multiple program modules. During the startup process of the image forming apparatus 1, the memory usage is updated at predetermine timing by the usage rate updater 73, and the latest memory usage is acquired.

The usage rate regulator 74 as the regulation unit limits starting up (executing) program modules by the multiple CPU cores base on the memory usage, and the usage rate regulator 74 limits usage of memory by the multiple CPU cores. Therefore, the usage rate regulator 74 is also a limit unit that limits starting up program modules, and the usage rate regulator 74 limits startup of program modules if the memory usage rate exceeds predetermined value. The startup adjuster 70 adjust startup of program modules by the multiple CPU cores and the memory usage by instructing the usage rate regulator 74 to limit the number of program modules executed by the multiple CPU cores.

In this case, the usage rate regulator 74 includes a determination unit that determines whether or not startup of program modules by the multiple CPU cores is limited based on the memory usage, and the usage rate regulator 74 limits startup of program modules by the multiple CPU cores based on the determination result provided by the determination unit. If the determination unit determines that the startup of program modules is limited, the usage rate regulator 74 stops executing new program modules.

Next, the startup process of multiple program modules is described below with reference to multiple flowcharts.

Figure 10:
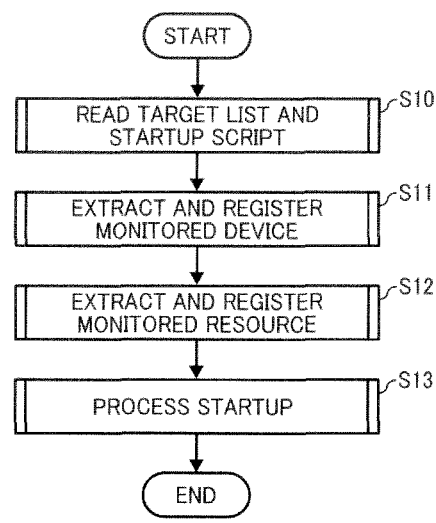
FIG. 10 is a flowchart illustrating processing procedure performed by the startup process module as an embodiment of the present invention.

FIG. 10 is a flowchart illustrating processing procedure performed by the startup process module 54 in this embodiment. The process shown in FIG. 10 starts by starting init process by the generic OS 55 by starting up init program.

As shown in FIG. 10, first, the main 63 in the startup process module 54 reads the target list 61 stored in the HDD 26 and the startup script 62 of the multiple program modules in S10 and stores the target list 61 and the startup script 62 in the MEM 25. Subsequently, after acquiring the startup condition of the program module described in the startup script 62, the startup script analyzer 64 specifies a device in the image forming apparatus 1 related to the startup condition of the program module based on the startup condition and extracts the device to he monitored. The extracted device is registered in the monitored device list in the MEM 25 as the device to be monitored in S11. The device monitor 66 monitors the device registered in the monitored device list and determines the state of each device.

In addition, based on the startup condition of the program module, the startup script analyzer 64 specifies resource in the image forming apparatus 1 related to the startup of the program module and extracts resource to be monitored. The extracted resource is registered in the monitored resource list in the MEM 25 as the resource to be monitored in S12. The resource monitor 67 monitors the resource registered in the monitored resource list and determines the state of each resource. Subsequently, the startup process module 54 performs the startup process of the program module in S13.

Figure 11:
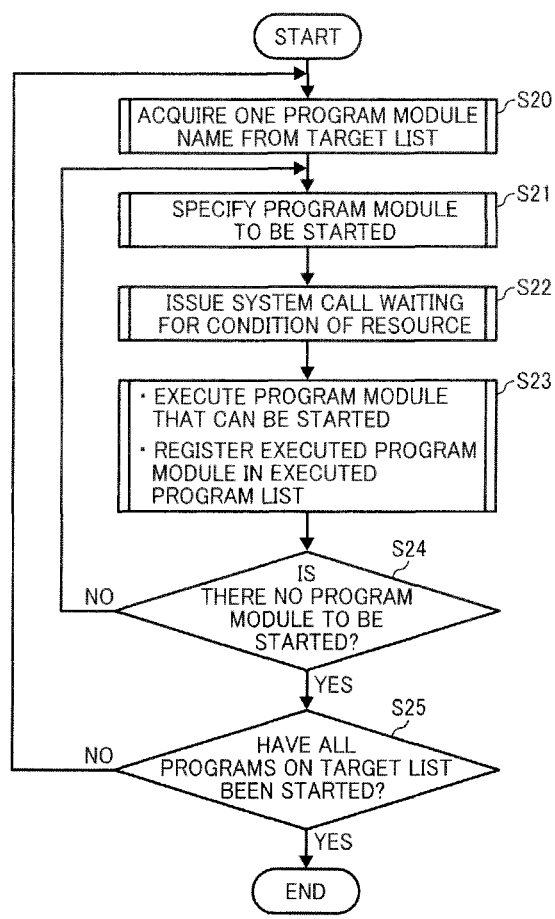
FIG. 11 is a flowchart illustrating procedure for starting up program modules by the startup process module as an embodiment of the present invention.

FIG. 11 is a flowchart illustrating procedure for starting up program modules by the startup process module 54 in this embodiment.

As shown in FIG. 11, first, the main 63 in the startup process module 54 acquires a name of a program module from the target list 61 in accordance with the priority in S20. The startup script analyzer 64 acquires the startup script 62 of the target program module corresponding to the name of the program module, and the startup script analyzer 64 acquires the startup condition of the target program module described in the startup script 62.

In addition, based on the startup condition of the target program module, the startup script 64 determines whether or not it is needed to execute another program module for executing the target program module. After the determination, if it is determined that it is needed to execute the other program module, the startup script analyzer 64 determines one or more program modules needed for executing the target program module. In that case, the startup script analyzer 64 acquires the startup script 62 and startup condition for each program module and specifies all program modules to be executed based on the startup condition.

If there are multiple program modules to be executed, based on the acquired startup condition of the multiple program modules, the startup script analyzer 64 determines the startup order of the multiple program modules using the multiple CPU cores. Subsequently, the main 63 instructs the multiple CPU cores to execute the executable program modules in accordance with the startup order and starts up the multiple program modules sequentially. In that case, first, the main 63 specifies the program module to be executed by the CPU core based on the startup order in S21.

Next, in order to determine whether or not it is needed to limit startup of the specified program module, the main 63 issues the system call described above (system call for waiting for resource condition) in S22. The startup adjuster 70 in the generic OS 55 (shown in FIG. 9) is called by the system call, and it is determined whether or not startup of the program module is limited. If resources in the image forming apparatus 1 (CPU resources and memory resources) satisfy predetermined resource conditions, it is unnecessary to limit startup of program modules, so it is determined that startup of program module is not limited. By contrast, if the resources do not satisfy the resource condition, it is needed to limit startup of program modules, so it is determined that startup of program module is limited. The startup adjuster 70 stops executing the new program module until the resources satisfy the resource conditions and it is unnecessary to limit startup of program modules.

In the present embodiment, the user preliminarily configures the image forming apparatus 1 whether or not the load average is checked and the memory is checked. If either one of checking processes or both checking processes are to be performed, the startup adjuster 70 performs a process of waiting for resource condition and adjusts startup of program modules. In that case, based on the load average, the startup limiter 72 in the startup adjuster 70 determines whether or not the multiple CPU cores satisfy the resource conditions requested of the CPU resources of the image forming apparatus 1. In addition, based on the memory usage, the usage rate regulator 74 in the startup adjuster 70 determines whether or not the memory satisfies the resource conditions requested of the memory resource in the image forming apparatus 1.

Figure 12:
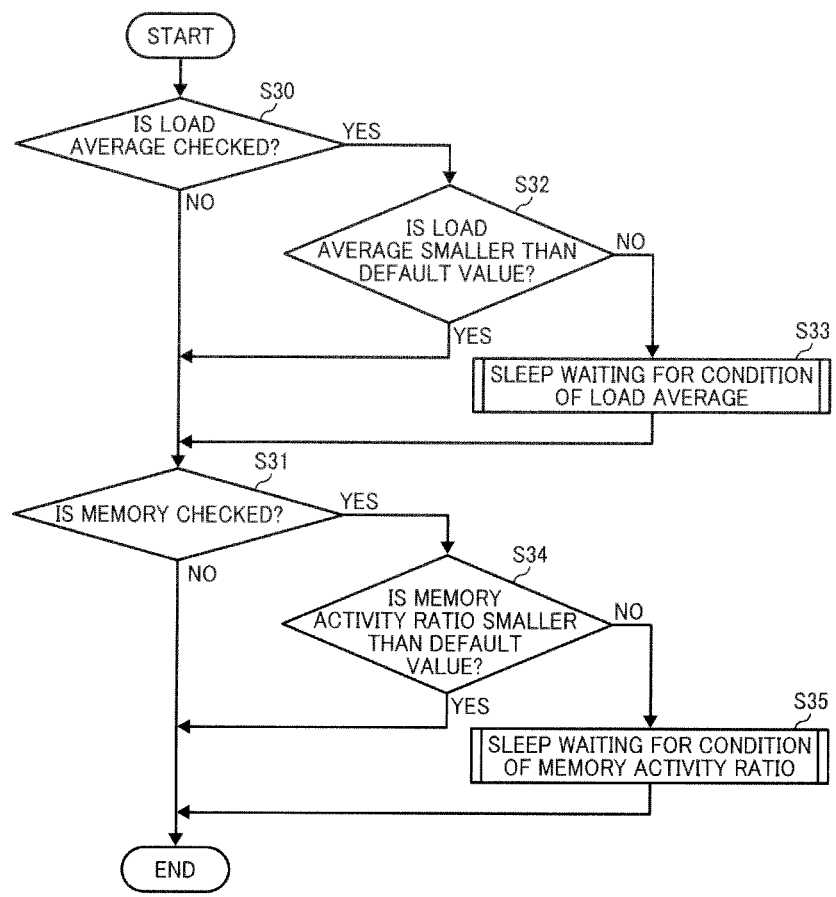
FIG. 12 is a flowchart illustrating processing procedure of the startup adjuster as an embodiment of the present invention.

FIG. 12 is a flowchart illustrating processing procedure of the startup adjuster 70 in this embodiment.

As shown in FIG. 12, first, based on the user configuration, the startup adjuster 70 determines whether or not the load average as load information on multiple CPU cores is checked in S30. After the determination, if the load average is not checked (NO in S30), the startup adjuster 70 determines whether or not the memory is checked base on the user configuration in S31. If the memory is not checked (NO in S31), the startup adjuster 70 finishes this process.

If the load average is checked (YES in S30), the load information updater 71 acquires the load average of the multiple CPU cores, and the startup limiter 72 determines whether or not the load average is smaller than a predetermined value in S32. If the load average is smaller than the predetermined value (YES in S32), the startup limiter 72 determines that it is not limited to execute a new program module by the multiple CPU cores. An upper limit of the load average that a new program module can be executed smoothly by the multiple CPU cores is set to the predetermined value of the load average preliminarily, e.g., a predetermined value smaller than the number of the CPU cores is set.

If the load average is larger than the predetermined value (NO in S32), the startup limiter 72 determines that it is limited to execute a new program module by the multiple CPU cores, and the startup limiter 72 instructs the startup process module 54 to transition to sleep mode (state of waiting for executing program module). Consequently, the startup process module 54 sleeps, and it is limited to execute a new program module. This sleep of the startup process module 54 corresponds to sleep waiting that the load average gets smaller than the predetermined value (sleep waiting for load average condition) in S33. The startup limiter 72 stops executing a new program module by the startup process module 54.

Next, if the memory is checked (YES in S31), the usage rate updater 73 acquires the memory usage, and the usage rate regulator 74 determines whether or not the memory usage is smaller than a predetermined value in S34. If the memory usage is smaller than the predetermined value (YES in S34), the usage rate regulator 74 determines that it is not limited to execute a new program module and to use memory by the multiple CPU cores. An upper limit of memory usage that a new program module can be executed smoothly by the multiple CPU cores is set to the predetermined value of the memory usage preliminarily.

If the memory usage is larger than the predetermined value (NO in S34), the usage rate regulator 74 determines that it is limited to execute a new program module and it is regulated to use memory by the multiple CPU cores, and the usage rate regulator 74 instructs the startup process module 54 to transition to sleep mode. Consequently, the startup process module 54 sleeps, and it is limited to execute a new program module and it is regulated to use memory. This sleep of the startup process module 54 corresponds to sleep waiting that the memory usage gets smaller than the predetermined value (sleep waiting for memory usage condition) in S35. The usage rate regulator 74 stops executing a new program module by the startup process module 54 and executing a new program module by the CPU core.

If the startup adjuster 70 does not instruct the startup process module 54 to transition to sleep mode, the startup process module 54 resumes starting up a program module (shown in FIG. 11). By contrast, if the startup adjuster 70 instructs the startup process module 54 to transition to sleep mode, the startup process module 54 is kept in sleep mode until the load average and the memory usage get smaller than the predetermined value. In that case, the startup adjuster 70 updates the load average and the memory usage at predetermined time interval and determines whether or not the sleep mode of the startup process module 54 is released. The determination by the startup adjuster 70 can be performed by an interrupt handler read at predetermined time interval using a hardware tinier similarly.

Figure 13:
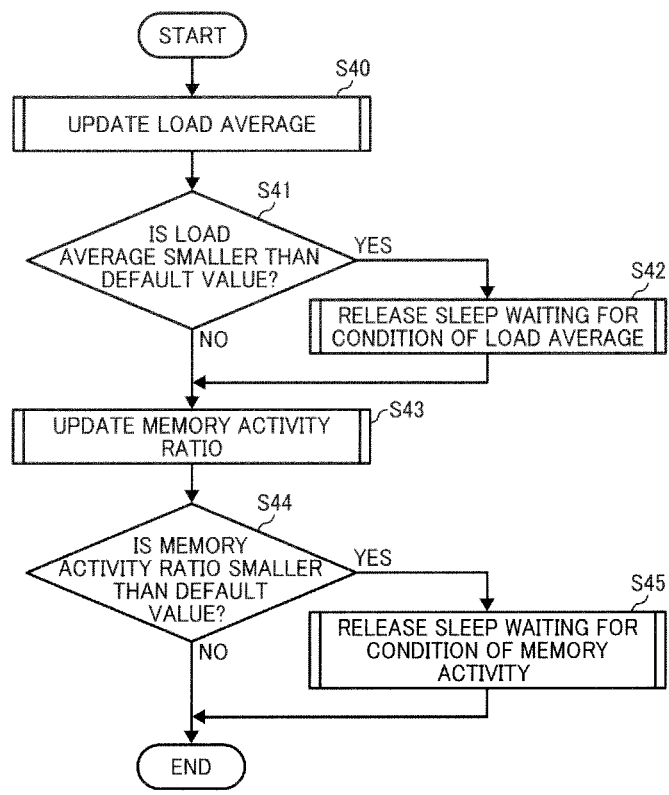
FIG. 13 is a flowchart illustrating procedure of waking up the startup process module from sleep mode as an embodiment of the present invention.

FIG. 13 is a flowchart illustrating procedure of waking up the startup process module from sleep mode in this embodiment.

As shown in FIG. 13, first, the load information updater 71 updates information used for calculating the load average, calculates the load average newly, and update the load average of the multiple CPU cores in S40. Subsequently, based on the load average updated by the load information updater 71, the startup limiter 72 determines whether or not it is limited to execute a new program module.

If the load average is larger than the predetermined value (NO in S41), the startup limiter 72 determines that it is not possible to execute a new program module and it is limited to execute a new program module. Accordingly, if the startup process module 54 is in sleep mode waiting on the load average, the startup limiter 72 maintains sleep mode waiting on the load average. If the load average is smaller than the predetermined value (YES in S41), the startup limiter 72 determines that it is possible to execute a new program module and it is not limited to execute the new program module. Accordingly, if the startup process module 54 is in sleep mode waiting on the load average, the startup limiter 72 releases sleep mode waiting on the load average of the startup process module 54 in S42, and the startup limiter 72 releases the new program module from stopping.

Next, the usage rate updater 73 updates information used for calculating the memory usage, calculates the memory usage newly, and updates the memory usage that the multiple CPU core uses in S43. Subsequently, based on the memory usage updated by the usage rate updater 73, the usage rate regulator 74 determines whether or not it is limited to execute a new program module, If the memory usage is larger than the predetermined value (NO in S44), the usage rate regulator 74 determines that it is limited to execute a new program module. Accordingly, if the startup process module is in the sleep mode waiting on the memory usage rate, the usage rate regulator 74 maintains the sleep mode waiting on the memory usage rate of the startup process module 54. If the memory usage is smaller than the predetermined value (YES in S44), the usage rate regulator 74 determines that it is not limited to execute a new program module. Accordingly, if the startup process module 54 is in the sleep mode waiting on the memory usage rate, the usage rate regulator 74 releases the sleep mode waiting on the memory usage rate of the startup process module 54 in S45, and the startup limiter 72 releases the new program module from stopping.

The startup adjuster 70 repeats the steps described above at predetermined time interval until all sleep modes of the startup process module 54 are exited. Consequently, the startup adjuster 70 limits executing a new program module and adjusts executing program modules by the multiple CPU cores. If all sleep modes of the startup process module 54 are exited, the startup process module 54 resumes executing program modules. Accordingly, as shown in FIG. 11, the main 63 in the startup process module 54 executes the program module specified by the CPU core base on the startup order in S23 and starts up the program module.

The program module executed by the CPU core is the executable program module that has not been executed yet but satisfies the startup condition. If the startup condition of the program module is not satisfied, the main 63 instructs the CPU core to execute the program module after the startup condition of the program module is satisfied. In addition, the program state monitor 65 also registers the program module executed by the CPU core in the list of executed programs in the MEM 25. Therefore, the program module that the main 63 instructs the CPU core to execute is not currently executed by the CPU core and has not been registered in the list of executed programs yet.

Next, the main 63 executes all program modules to be executed and determines whether or not any program module to be executed is left in S24. If there is still a program module to be executed (NO in S24), the main 63 repeats the steps described above (from S21 to S24) until all program modules to be executed are executed. If it is finished to execute all program modules to he executed (YES in S24), the main 63 determines whether or not it is finished to execute all target program module described in the target list 61 in S25. If it is not finished to execute all target program modules (NO in S25), the main 63 repeats the steps described above (from S20 to S25).

Between the start of execution and the end of execution of the multiple program modules, a system call waiting for resource condition is issued each time when a new program module is executed in S22. Accordingly, based on the latest load average updated by the load information updater 71, the startup limiter 72 determines whether or not it is limited executing a new program module by the multiple CPU cores. After the determination, if it is determined that it is limited executing a new program module, the startup limiter 72 limits executing the new program module by the multiple CPU cores. In addition, based on the latest memory usage updated by the usage rate updater 73, the usage rate regulator 74 determines whether or not it is limited executing a new program module by the multiple CPU cores. After the determination, if it is determined that it is limited executing a new program module, the usage rate regulator 74 limits executing the new program module by the multiple CPU cores and regulates memory usage by the multiple CPU cores.

As a result, it is possible to adjust startup of the program modules and execute multiple program modules in accordance with the startup order. After finishing executing all target program modules (YES in S25), the startup process module 54 finishes the process of starting up multiple program modules. In addition, by executing all target program modules described in the target list 61, the startup process of the image forming apparatus 1 finishes, and the image forming apparatus 1 starts operating.

As described above, in the image forming apparatus 1 and the startup method of the image forming apparatus 1 in this embodiment, it is possible to reduce the resource conflict during the startup process of the image forming apparatus 1 and utilize the multiple CPU cores in the multicore CPU 23 effectively. In addition, it is possible to execute multiple program modules of the startup process by the multiple CPU cores smoothly, and that can reduce delay of the startup of the image forming apparatus 1. It is also possible to cut the startup time of the image forming apparatus 1 and start up the image forming apparatus quickly. By limiting the execution of the program modules based on the load average updated by the load information updater 71, it is possible to execute the startup process of the image forming apparatus 1 smoothly in accordance with load variation of multiple CPU cores during the startup process appropriately.

The image forming apparatus 1 limits executing program modules and regulates using memory by the multiple CPU cores based on the memory usage. Therefore, it is possible to reduce the conflict of the memory used by the multiple CPU cores and execute multiple program modules smoothly. As a result, it is possible to reduce delay in the startup of the image forming apparatus 1 much more assuredly. Especially, since the memory capacity is Limited in embedded systems, it is possible to make a profound effect by limiting the startup of program modules based on the memory usage. If it is configured to perform swapping, the startup of multiple program modules can be delayed substantially in some cases since the HDD 26 is accessed due to the swapping. To cope with this issue, it is possible to reduce the swapping and the delay in the startup of the multiple program modules by limiting the startup of the program modules based on the memory usage.

In case of limiting the startup of the program modules, it is possible to remove the limitation on the startup of the program modules if the predetermined time, the load average, or the memory usage is smaller than the predetermined value. Consequently, even if the load average or the memory usage vary intensively, it is possible to execute the multiple program modules smoothly in accordance with the multiple CPU cores and the state of the memory precisely. It is also possible to execute the multiple program modules in the range that the load average does not exceed the number of CPU cores.

If it is specified that a predetermined program module be executed by a predetermined CPU core by configuring the image forming apparatus 1, it is possible to limit the startup of the program modules based on the load average of each of the CPU cores. In this case, the load information updater 71 acquires and updates the load average of the predetermined CPU core specified to execute the predetermined program module. The startup limiter 72 determines whether or not is limited to execute the predetermined program module based on the updated load average of the predetermined CPU core, and the startup limiter 72 limits the startup of the predetermined program module by the predetermined CPU core. Consequently, it is possible to execute the predetermined program module by the predetermined CPU core smoothly.

The CPU core executes not only the program modules but also a thread generated during the startup process of the image forming apparatus 1. Therefore, the load average and the memory usage of the multiple CPU cores can vary and the resources can conflict due to the generation of the thread too. Thus, it is preferable to limit the generation of the thread in order to reduce resource conflict. In the image forming apparatus 1, it is limited to generate the thread by user configuration just like the limitation on the startup of the program modules.

Figure 14:
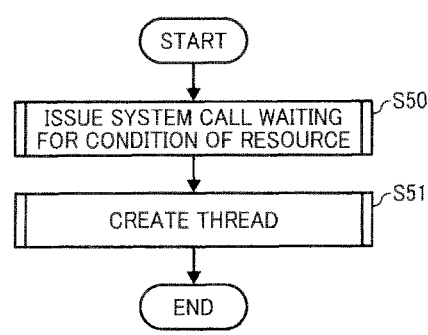
FIG. 14 is a flowchart illustrating generating a thread as an embodiment of the present invention.
Figure 15:
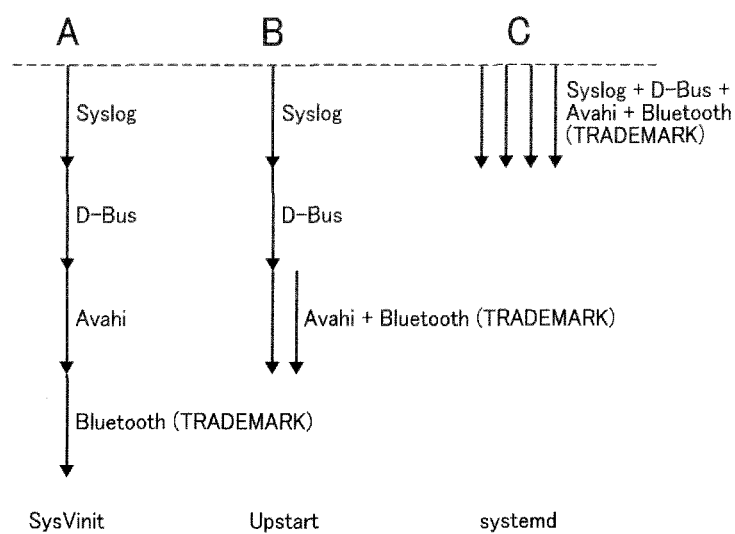
FIG. 15 is a diagram illustrating procedure of a startup process executed by a conventional information processing apparatus.

FIG. 14 is a flowchart illustrating generating a thread in this embodiment.

Here, as shown in FIG. 14, if it is requested to generate a thread during the startup of the multiple program modules in the startup process, first, a system call waiting for a resource condition is issued in S50, and a process of waiting for the resource condition starts. Since the process of waiting for the resource condition is similar to the processes shown in FIGS. 12 and 13 described before, description for the process of waiting for the resource condition is omitted.

In this regard, in the process of waiting for the resource condition, it is determined whether or not it is limited to generate a new thread based on each of the load average and the memory usage. As a result, if it is determined to limit the generation of the new thread, a thread generator (not shown in figures) included in the image forming apparatus 1 transitions to sleep mode. Consequently, in the startup process of the image forming apparatus 1, it is limited that the thread generator generates the new thread. In case of releasing the sleep mode of the thread generator based on each of the load average and the memory usage, the thread generator performs a thread generating process, and the new thread is generated in S51.

The image forming apparatus 1 includes a unit that performs processes regarding the generation of a thread described above, e.g., a unit that limits the generation of a thread during the startup process based on the load average updated by the load information updater 71. In addition, the image forming apparatus 1 includes a unit that limits the generation of a thread during the startup process based on the memory usage updated by the usage rate updater 73. The thread generation limitation units described above limit the generation of threads along with executing the program modules by the multiple CPU cores. By limiting the generation of threads, it is possible to reduce the resource conflict and execute the multiple program modules smoothly.

The image forming apparatus 1 that includes the multicore CPU 23 is described above. However, the image forming apparatus 1 can include multiple single core CPUs instead of the multicore CPU 23. The single core CPU includes one CPU core, and the CPU cores of the multiple single core CPUs functions similar to the multiple CPU cores in the multicore CPU 23. In this case, the image forming apparatus 1 processes information and executes multiple program modules using the CPU cores of the multiple single core CPUs.

In the embodiment described above, it is limited to execute the program module based on both the load average and the memory usage. However, it is possible to limit the startup of the program module based on either the load average or the memory usage. That is, it is possible to limit the startup of the program module based on the load average only, or it is possible to limit the startup of the program module based the memory usage only.

It is possible to implement the units in the image forming apparatus 1 described above by executing a program by a computer in the image forming apparatus 1 as an information processing apparatus. The information processing apparatus is various apparatuses that process information, e.g., a personal computer, a server, and an embedded system. The information processing apparatus is embedded in various apparatuses such as an image processing apparatus, an image capturing apparatus, a display apparatus, an office apparatus, a communication apparatus, a portable apparatus, an information processing device, and a communication device as the embedded system.

Numerous additional modifications and variations are possible in light of the above teachings. It is therefore to be understood that, within the scope of the appended claims, the disclosure of this patent specification may be practiced otherwise than as specifically described herein. For example, it is possible that the image forming apparatus includes the document holding determination unit only. Alternatively, it is possible that the image forming apparatus includes the document holding determination unit and any one of or any combination of the rangefinder, the user authentication unit, the recovery processor, the print job acquisition unit, the auxiliary parameter setting unit, and the facsimile number setting unit.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An information processing apparatus, comprising:
   a startup condition acquisition unit to acquire a startup condition of each one of multiple program modules;
   a determination unit to determine a startup order of starting the multiple program modules by multiple CPU cores based on the startup condition of each one of the multiple program modules;
   a startup unit to start up at least one of the multiple program modules that is executable in the startup order using the multiple CPU cores;
   an updating unit to update load information that indicates multiple CPU core load on the multiple CPU cores that changes during the startup process; and
   a limitation unit to limit startup of the executable program module by the multiple CPU cores based on the load information updated by the updating unit,
   wherein functions of the startup condition acquisition unit, the determination unit, the startup unit, the updating unit and the limitation unit are performed by execution of program instructions which are stored in a non-transitory, computer-readable recording medium, by a processor of the information processing apparatus.

2. The information processing apparatus according to claim 1, wherein the limitation unit determines whether or not it is possible to execute a program module of the multiple program modules to be executed next using the multiple CPU cores executing the program module based on the load information, and the limitation unit limits the startup of the program module to be executed by the multiple CPU cores based on a result of the determination by the limitation unit.

3. The information processing apparatus according to claim 2, wherein the limitation unit further comprises:
   a stop unit to stop executing the program module to be executed if the limitation unit determines that it is not possible to execute both of the executing program module and the program module to be executed simultaneously; and
   a release unit to release a stop of execution of the program module to be executed if the limitation unit determines that it is possible to execute both program modules simultaneously.

4. The information processing apparatus according to claim 1, wherein the limitation unit further comprises:
   a specification unit to specify a dependency relation among the multiple program modules based on the startup condition, and
   wherein the determination unit determines the startup order of starting the multiple program modules based on the dependency relation.

5. The information processing apparatus according to claim 1, further comprising a restriction unit to restrict generation of a thread in the startup process based on the load information updated by the updating unit.

6. The information processing apparatus according to claim 1, further comprising:
   a usage acquisition unit to acquire memory usage rate by the multiple CPU cores; and
   a regulation unit to regulate the startup of the program module by the multiple CPU cores and regulate utilization of memory by the multiple CPU cores.

7. The information processing apparatus according to claim 6, further comprising a confinement unit to confine generation of a thread during the startup process based on the memory usage.

8. The information processing apparatus according to claim 1, wherein the updating unit updates load information on load of a predetermined CPU core designated to execute the program module that is executable, and the limitation unit limits the execution of the program module that is executable by the predetermined CPU core based on the load information on the predetermined CPU core.

9. A method of controlling startup of an information processing apparatus, the method comprising the steps of:
  acquiring a startup condition of each one of multiple program modules;
  determining a startup order of starting the multiple program modules by multiple CPU cores based on the startup condition of each one of the multiple program modules;
  starting up at least one of the multiple program modules that is executable in the startup order using the multiple CPU cores;
  updating load information that indicates multiple CPU core load on the multiple CPU cores that changes during the startup process; and
  limiting startup of the executable program module by the multiple CPU cores based on the load information updated by the updating unit.

10. A non-transitory, computer-readable recording medium storing a program that, when executed by a processor, causes the processor to implement a method of controlling startup of an information processing apparatus, the method comprising the steps of:
  acquiring a startup condition of each one of multiple program modules;
  determining a startup order of starting the multiple program modules by multiple CPU cores based on the startup condition of each one of the multiple program modules;
  starting up at least one of the multiple program modules that is executable in the startup order using the multiple CPU cores;
  updating load information that indicates multiple CPU core load on the multiple CPU cores that changes during the startup process; and
  limiting startup of the executable program module by the multiple CPU cores based on the load information updated by the updating unit.

* * * * *